US012662605B2

(12) United States Patent
Yamanaka et al.

(10) Patent No.: US 12,662,605 B2
(45) Date of Patent: Jun. 23, 2026

(54) COMPOSITION CONTAINING ADDITION CONDENSATION PRODUCT, METHOD FOR PRODUCING SAME, USE OF SAME, POLYMERIZATION VESSEL, AND METHOD FOR PRODUCING POLYMER

(71) Applicant: Shin-Etsu Chemical Co., Ltd., Tokyo (JP)

(72) Inventors: Kentaro Yamanaka, Kamisu (JP); Yoshikatsu Tsuchiya, Kamisu (JP); Masahiro Usuki, Kamisu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 934 days.

(21) Appl. No.: 17/811,382

(22) Filed: Jul. 8, 2022

(65) Prior Publication Data

US 2023/0037858 A1 Feb. 9, 2023

(30) Foreign Application Priority Data

Jul. 20, 2021 (JP) ................................ 2021-119747

(51) Int. Cl.

| | |
|---|---|
| ***C09D 161/06*** | (2006.01) |
| ***B01J 19/02*** | (2006.01) |
| ***C08G 8/02*** | (2006.01) |
| ***C08G 8/10*** | (2006.01) |
| ***C08L 61/06*** | (2006.01) |
| ***C08L 61/16*** | (2006.01) |

(52) U.S. Cl.

CPC ............ *C09D 161/06* (2013.01); *B01J 19/02* (2013.01); *C08G 8/02* (2013.01); *C08G 8/10* (2013.01); *C08L 61/06* (2013.01); *C08L 61/16* (2013.01); *B01J 2219/0245* (2013.01)

(58) Field of Classification Search

CPC .......... C09D 161/06; C08G 8/10; C08G 8/02; C08L 61/06; C08L 61/16; B01J 19/02; B01J 2219/0245

See application file for complete search history.

(56) References Cited

U.S. PATENT DOCUMENTS

| | | | | |
|---|---|---|---|---|
| 5,364,957 A * | 11/1994 | Arnoldy | C07C 67/38 560/207 |
| 6,894,125 B2 * | 5/2005 | Kamata | C08F 2/005 526/62 |
| 2010/0261854 A1 | 10/2010 | Watanabe et al. | |
| 2013/0046067 A1 * | 2/2013 | Hefner, Jr. | C08G 59/08 564/325 |

FOREIGN PATENT DOCUMENTS

| | | |
|---|---|---|
| JP | 5445142 B2 | 3/2014 |

* cited by examiner

*Primary Examiner* — Patrick D Niland
(74) *Attorney, Agent, or Firm* — Oblon, McClelland, Maier & Neustadt, L.L.P.

(57) ABSTRACT

An addition condensation product, i.e., an addition condensation product of an aromatic compound with a carbonyl compound, is obtained as a condensation reaction product in the state of uniform solution or the like, in which clumping caused by agglomeration of the condensation product of the aromatic compound with the carbonyl compound can be prevented by the presence of a surfactant at the time of the condensation reaction. In addition, a coating solution prepared by using an original solution or an adjusted solution whose viscosity is 2.0 mPa·s or greater exhibits an excellent polymer scale adhesion inhibition effect when applied to an inner wall and the like of a polymerization vessel; and in addition, a low-accumulative coating film is formed when the solution is applied to an inner wall and the like of a polymerization vessel.

20 Claims, 1 Drawing Sheet

COMPOSITION CONTAINING ADDITION CONDENSATION PRODUCT, METHOD FOR PRODUCING SAME, USE OF SAME, POLYMERIZATION VESSEL, AND METHOD FOR PRODUCING POLYMER

CROSS-REFERENCE TO RELATED APPLICATION(S)

The present application claims priority to and incorporates by reference the entire contents of Japanese Patent Application No. 2021-119747 filed in Japan on Jul. 20, 2021.

BACKGROUND OF THE INVENTION

1. Field of the Invention

The present invention relates to a polymer scale adhesion inhibitor, a polymerization vessel, a method for producing the polymer scale adhesion inhibitor, and a method for producing a polymer. The present invention especially relates to a polymer scale adhesion inhibitor that has a property of preventing a polymer scale from adhering to an inner wall surface and the like of a polymerization vessel upon producing a polymer by polymerizing a monomer having an ethylenic double bond in the polymerization vessel, to a polymerization vessel coated with the polymer scale adhesion inhibitor, to a method for producing the polymer scale adhesion inhibitor, and to a method for producing the polymer.

2. Description of the Related Art

It has been known that, upon polymerizing a monomer having an ethylenic double bond, the polymer thereby formed adheres to an inner wall surface and the like of a polymerization vessel as a scale. Adhesion of this polymer scale becomes eminent as the polymerization batch number is increased thereby leading to decrease in a yield of the polymer, a cooling capacity of the polymerization vessel, and the like. In addition, there is a problem in that the polymer scale that is detached from the inner wall surface and the like of the polymerization vessel contaminates the obtained polymer thereby resulting in deterioration of the product quality. On top of these problems, not only the removing work of the polymer scale that adheres to the inner wall surface and the like of the polymerization vessel requires excessive working load and time, but also there is a danger that an unreacted monomer included in the polymer scale may cause a harm to a human body.

Conventionally, when the monomer having an ethylenic double bond is polymerized, there has been known the method in which in order to prevent the polymer scale from adhering to the inner wall surface and the like of the polymerization vessel, a coating film is formed on the inner wall surface, an agitator, and the like of the polymerization vessel by applying a polymer scale adhesion inhibitor (hereinafter, this is also called "scale inhibitor"). Known examples of the polymer scale adhesion inhibitor include a mixture of a condensation reaction product, which is obtained from a naphthol and a carbonyl compound, with an organic phosphate compound (and a water-soluble dye, in addition) or the like (Japanese Patent No. 5445142).

However, in the polymer scale adhesion inhibitor described in Japanese Patent No. 5445142, depending on the amount of a catalyst or of an organic solvent, the condensation product of an aromatic compound with a carbonyl compound agglomerates thereby causing clumping due to a reaction in this agglomerated state (local high concentration reaction), so that there has been a problem in that the condensation reaction product could not be obtained in the state of a uniform solution.

In addition, it became apparent that with repetition of the polymerization batch, the polymer scale adhesion inhibitor described in Japanese Patent No. 5445142 causes deposition due to the polymer scale adhesion inhibitor that is adsorbed onto the inner wall surface of a polymerization vessel, a polymerization assisting agent, and an unreacted carbonyl compound, thereby resulting in an eminent decrease in the overall heat transfer coefficient. Specifically, after about 1000 batches, the thickness thereof reaches 50 μm, and the overall heat transfer coefficient becomes about 15%. When the polymerization batch number is increased to about 1000 or more, the polymer scale starts to adhere onto an irregular coating film of the polymer scale adhesion inhibitor; so, the adhering polymer scale grows. Then, the growth reaches to the point where the detached scale contaminates the obtained polymer. Therefore, there has been a problem of causing fish eyes in the polymer product.

When a coating agent prepared using the polymer scale adhesion inhibitor described in Japanese Patent No. 5445142 is applied as illustrated in FIG. 2, an adhering amount to the vessel wall is so large thereby resulting in a thick accumulation through repeated polymerization and application; as a result, this accumulated product causes problems of a decrease in the overall heat transfer coefficient of the polymerization vessel and of fish eyes in the polymer product as described above.

SUMMARY OF THE INVENTION

The present invention has been made in the light of the circumstances mentioned above; thus, an object thereof is to provide a reaction system in which a condensation reaction product can be obtained in the state of a uniform solution without causing clumping of the condensation product during the condensation reaction, especially to provide a composition containing an addition condensation product that can form, as a polymer scale adhesion inhibitor especially for production of a polymer of a monomer having an ethylenic double bond, a very thin coating film capable of realizing prevention of adhesion of a polymer scale onto an inner surface wall and the like of a polymerization vessel thereby increasing productivity of the polymer, as well as to provide a method for producing the composition containing the addition condensation product, a polymerization vessel coated with the addition condensation product, and a method for producing the polymer.

The inventors of the present invention carried out an extensive investigation to achieve the object described above; and as a result, it was found that an addition of a surfactant prevents clumping caused by agglomeration of the condensation product of the aromatic compound with the carbonyl compound, and thereby the condensation reaction product can be obtained in the state of a uniform solution or the like. Furthermore, it was found that when the resulting solution was applied as the polymer scale adhesion inhibitor onto the inner wall surface of a polymerization vessel for production of the polymer of a monomer having an ethylenic double bond, not only a film of the polymer scale adhesion inhibitor thinner than ever could be formed but also a sufficient scale adhesion preventive performance could be expressed. In other words, although the polymer scale adhesion inhibitor can cause a decrease in the overall heat transfer coefficient of the polymerization vessel jacket as described above, this deposition can be effectively prevented by using the product according to the present invention. In addition, it was found that a viscosity and a solvent amount can be used as the parameters to judge an effective polymer scale adhesion inhibitor; as a result, the present invention could be achieved.

In this specification, "clumping" means "large agglomerates, i.e., the agglomerates that are so large as to make agitation unstable, and that are not redispersed and remain in the agglomerated state at the time of recovery". On the other hand, when a surfactant is added, "agglomeration" can take place at odd times, but the agglomerates are so fine that agitation is not destabilized and that the agglomerates dissolve (disperse) thereby resulting in the uniform state as the reaction progresses. Thus, "agglomeration" and "clumping" differ in the level of the states.

Accordingly, the present invention provides a composition containing a below-described addition condensation product of an aromatic compound with a carbonyl compound, a use of the composition containing the addition condensation product as a polymer scale adhesion inhibitor, a polymerization vessel coated with the polymer scale adhesion inhibitor, a method for producing the polymer scale adhesion inhibitor, and a method for producing a polymer.

[1] A composition containing an addition condensation product of an aromatic compound with a carbonyl compound, and a solvent, wherein the addition condensation product is an aromatic compound multimer in which two or more composition units derived from the aromatic compound are each bonded via one composition unit derived from the carbonyl compound, and is obtained by causing the aromatic compound to react with the carbonyl compound in the solvent in presence of a catalyst and a surfactant (excluding the addition condensation product) whose amount is 0.01 equivalents or greater relative to the aromatic compound, the surfactant is a surfactant satisfying an HLB value in a range of 15 to 50 both inclusive as calculated in accordance with "HLB value calculation method using an organic conceptual diagram method by Fujita, Oda, et al.", the solvent is included in the composition in an amount of 95% by mass or less, and the composition is in a solution state with a viscosity of 2.0 mPa·s or greater at 25° C., or in a gel-like state at 25° C.

[2] The composition containing the addition condensation product according to [1], wherein the composition is in a solution state with a viscosity of 2.5 mPa·s or greater at 25° C.

[3] The composition containing the addition condensation product according to [1], wherein the aromatic compound is naphthols.

[4] The composition containing the addition condensation product according to [1], wherein the carbonyl compound is an aldehyde compound or a ketone compound.

[5] The composition containing the addition condensation product according to [1], wherein the aromatic compound is a compound represented by a general formula (1) described below and the carbonyl compound is an aldehyde compound represented by a general formula (2) described below, provided that in the general formulae (1) and (2), $R^1$, $R^2$, and $R^3$ each represent a hydrogen atom or a hydrocarbon group:

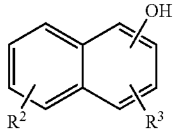

(1)

$R^1$—CHO. (2)

[6] The composition containing the addition condensation product according to [1], wherein the aromatic compound is α-naphthol, and the carbonyl compound is formaldehyde.

[7] The composition containing the addition condensation product according to [1], wherein the surfactant is an anionic surfactant.

[8] A method for producing a composition that contains an addition condensation product of an aromatic compound with a carbonyl compound and a solvent, the method containing: causing an addition condensation reaction of the aromatic compound with the carbonyl compound in a reaction solvent in presence of a catalyst and a surfactant whose amount is 0.01 equivalents or greater relative to the aromatic compound (excluding the addition condensation product) to obtain the addition condensation product, wherein the addition condensation product is an aromatic compound multimer in which two or more composition units derived from the aromatic compound are each bonded via one composition unit derived from the carbonyl compound, the surfactant is a surfactant satisfying an HLB value in a range of 15 to 50 both inclusive as calculated in accordance with "HLB value calculation method using an organic conceptual diagram method by Fujita, Oda, et al.", the composition containing the addition compound includes the solvent in an amount of 95% by mass or less, and the composition is in a solution state with a viscosity of 2.0 mPa·s or greater at 25° C., or in a gel-like state at 25° C.

[9] The method for producing the composition containing the addition condensation product according to [8], wherein the aromatic compound is α-naphthol, the carbonyl compound is formaldehyde, and the catalyst is an alkali metal hydroxide.

[10] The method for producing the composition containing the addition condensation product according to [8], wherein the surfactant is an anionic surfactant.

[11] A polymerization vessel used for polymerization of a monomer, wherein in the composition containing the addition condensation product according to [1], the addition condensation product is adhered to a surface of an inner wall of the polymerization vessel to which the monomer contacts.

[12] The polymerization vessel according to [11], wherein the vessel is equipped with a reflux condenser for condensing the monomer during a polymerization reaction.

[13] The polymerization vessel according to [11], wherein the monomer is a monomer containing an ethylenic unsaturated group.

[14] The polymerization vessel according to [13], wherein the monomer containing an ethylenic unsaturated group is vinyl chloride.

[15] A method for producing a polymer containing polymerizing the monomer in the polymerization vessel according to [11].

[16] A use of the composition containing the addition condensation product according to [1] as a polymer scale adhesion inhibitor for use in polymerization of vinyl chloride or of a monomer mixture mainly composed of vinyl chloride.

[17] The composition comprising the addition condensation product according to [2], wherein the aromatic compound is naphthols.

[18] The composition comprising the addition condensation product according to [2], wherein the carbonyl compound is an aldehyde compound or a ketone compound.

[19] The composition comprising the addition condensation product according to [3], wherein the carbonyl compound is an aldehyde compound or a ketone compound.

[20] The composition comprising the addition condensation product according to [2], wherein the aromatic compound is a compound represented by a general formula (1) described below and the carbonyl compound is an aldehyde compound represented by a general formula (2) described below, provided that in the general formulae (1) and (2), $R^1$, $R^2$, and $R^3$ each represent a hydrogen atom or a hydrocarbon group:

(1)

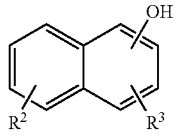

(2)

$R^1$—CHO.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
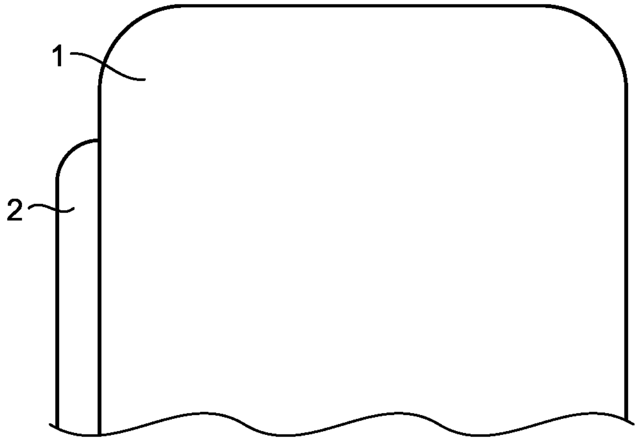
FIG. 1 is a schematic diagram illustrating one example of a tool with which a composition according to the present invention, containing an addition condensation product of an aromatic compound with a carbonyl compound, is applied.

Hereinafter, the present invention will be described in more detail.

Composition Containing Addition Condensation Product

A composition containing an addition condensation product according to the present invention includes an addition condensation product of an aromatic compound with a carbonyl compound and a solvent. In this composition, the solvent is included in an amount of 95% by mass or less. Specifically, the composition is in the solution-like (solution) state having a viscosity of 2.0 mPa·s or greater at 25° C., or in the gel-like state at 25° C.; both the states containing the addition condensation product of the aromatic compound with the carbonyl compound. The addition condensation product is an aromatic compound multimer in which two or more composition units derived from the aromatic compound are each bonded via one composition unit derived from the carbonyl compound, and is obtained by reacting the aromatic compound with the carbonyl compound in the presence of a catalyst and a surfactant in the reaction solvent. In addition, when the composition containing the addition condensation product according to the present invention is used as a polymer scale adhesion inhibitor, the surfactant contained in the composition can suppress the adhesion amount of the addition condensation product in the present invention to a polymerization vessel thereby resulting in a thin film thereof; thus, a sufficient scale adhesion preventive performance can be expressed. The adhesion amount of the coating film may be calculated from the peak area in a high-performance liquid chromatography. In addition, because the adhesion amount is small, even when many polymerization batches are repeated, deposition due to the polymer scale adhesion inhibitor, a polymerization assisting agent, and an unreacted carbonyl compound does not occur; thus, the decrease in the overall heat transfer coefficient of the polymerization vessel jacket can be effectively prevented. On the other hand, the polymer scale adhesion inhibitor described in Japanese Patent No. 5445142 cannot sufficiently and effectively prevent the decrease in the overall heat transfer coefficient of the polymerization vessel jacket because of a large adhesion amount thereof.

Specifically, in the addition condensation product, the aromatic compound has a portion that constitutes the composition unit (A) that is derived from the aromatic compound. Also, in the addition condensation product, the carbonyl compound has a portion that constitutes the composition unit (B) that is derived from the carbonyl compound. In this specification, the aromatic compound dimer means the compound having the A-B-A structure, and the aromatic compound multimer means the compound having the A-B-A-•••-B-A structure in which "A" and "B" are alternately disposed.

The composition containing the addition condensation product according to the present invention is usually prepared as a solution or a gel that contains the addition condensation product. Specifically, the composition containing the addition condensation product is the composition containing the addition condensation product that is obtained by mixing an aromatic compound, a carbonyl compound, a catalyst, and a surfactant in a reaction solvent followed by the addition condensation reaction of the aromatic compound with the carbonyl compound.

Aromatic Compound

Specifically, illustrative examples of the aromatic compound include a benzene derivative, a naphthalene derivative, a polynuclear aromatic compound, and a non-benzene type aromatic compound. The number of the conjugative n bond included in the benzene derivative, the naphthalene derivative, the polynuclear aromatic compound, and the non-benzene type aromatic compound is preferably in the range of 3 to 20. These compounds may be used singly or as a combination of two or more of them.

Illustrative examples of the benzene derivative include phenol and its derivatives, such as phenol, 2-methylphenol, 3-methylphenol, 4-methylphenol, and 3,5-dimethylphenol; aromatic amines and their derivatives, such as pyridine, quinoline, carbazole, o-phenanthroline, p-phenanthroline, 3,6-diaminoacridine, 3-aminophenothiazine, 2-aminophenadine, phenothiazine, and 2-hydroxy-4-methylquinoline; nitro- and nitroso-derivatives such as nitrobenzene, phenazine, phenazine oxide, 1-phenylazo-2-naphthol, triphenodioxazine, and 4-nitroxanthone; aromatic aldehydes such as benzaldehyde and benzofuran; benzene derivatives further having one substituent group other than the aldehyde group, such as 1-hydroxy-2,4-methylfluorone, 3-phenylcumarone, ethyl cumarine-3-carboxylate, 3-acetylcumarine, 5-chloro-3-(4-hydroxyphenyl)anthranyl, and 3-nitroacridone; benzene derivatives further having one substituent group other than the acyl group, such as xanthone, 2-benzoylxanthone, xanthene, and fluorene; benzene and toluene derivatives having 3 or more different substituent groups, such as 7-acetoxy-8-methoxy-3-(2-nitrophenyl)carbosteryl; aralkyl compounds such as 9-benzylacridine; and diazo compounds and azo compounds, such as 1.1'-azonaphthalene and azoxyphenol.

Illustrative examples of the naphthalene derivative include alkyl, alkenyl, and phenyl naphthalenes, such as 2-methylnaphthalene, 1-ethylnaphthalene, 2-ethylnaphthalene, and 1,2-dimethylnaphthalene; dinaphthyls such as 1,1'-dinaphthyl, 1,2'-dinaphthyl, and 2,2'-dinaphthyl; naphthylarylmethanes such as 1-benzylnaphthalene, 2-benzylnaphthalene, 1-(α,α-dichlorobenzyl)naphthalene, diphenyl-α-naphtylmethane, diphenyl-β-naphtylmethane, and di-α-naphtylmethane; napthylarylethanes such as 1,2-di-α-naphtylethane and 1,2-di-β-naphtylethane; hydronaphthalenes such as 1,2-dihydronaphthalene, 1,4-dihydronaphthalene, and 1,2,3,4-tetrahydronaphthalene; nitronaphthalenes and their derivatives, such as nitromethylnaphthalenes, nitroalkylnaphthalenes, nitrophenylnapthalenes, halonitronaphthalenes, halodinitronaphthalenes, nitrosonaphthalenes, diaminonaphthalenes, triaminonaphthalenes, and tetraaminonaphthalenes; halogenated naphthalenes such as 1-fluoronaphthalene, 1-chloronaphthalene, and 1-chloro-3,4-dihydronaphthalene; naphthylhydroxylamines, naphthylpyrazines, and naphthylureas, such as α-naphthylhydroxylamine, β-naphthylthiohydroxylamine, N-nitroso-α-naphthylhydroxylamine, α-naphthylhydrazine, and 1,2-dibenzocarbazole; naphthalene type aralkyl compounds such as dibenzoanthracene, acenaphthene, diphenyl naphthyl chloromethane, and nitromethylnaphthalene; naphthoaldehydes and their derivatives, such as α-naphthaldehyde and 2-(2,4-dinitrophenyl)-1-(α-naphthyl) ethylene; acetonaphthenes and benzoylnaphthalenes, such as (1,2- or 5,6-)dibenzanthracene, 2'-methyl-2,1'-dinaphthyl ketone, 2-methyl-1,1'-dinaphthyl ketone, and styryl-2-naphthyl ketone; and naphthols such as 1-naphthol (α-naphthol), 2-naphthol, 1,3-dihydoxy-naphthalene, 1,5-dihydoxy-naphthalene, 1,7-dihydoxy-naphthalene, 6-hydroxy-2-naphthoic acid, 2-hydroxy-1-naphthoic acid, 1-hydroxy-2-naphthoic acid, and 1-hydroxy-8-naphthoic acid.

Illustrative examples of the polynuclear aromatic compound include: anthracene and its derivatives, such as anthracene, 1,2-dihydroanthracene, 1-chloloanthracene, 1,4-dichloroanthracene, 1-nitroanthracene, 9,10-dinitroanthracene, 1-aminoanthracene, 2-dimethylaminoanthracene, 2-anilinoanthracene, 9-methylaminoanthracene, and 1,4-diaminoanthracene; phenanthrene and its derivatives, such as phenanthrene, 9,10-dihydrophenanthrene, 1,2,3,4-tetrahydrophenanthrene, and 1-chlorophenanthrene; or polynuclear aromatic compounds and their derivatives, such as pentacene, hexacene, benzophenanthrene, benzo[a]anthracene, pyrene, and coronene.

Illustrative examples of the non-benzene type aromatic compound include azulene, cyclodecapentane, cyclotetradecaheptane, cyclooctadecanonaene, cyclotetracosadodecaene, heptalene, fulvalene, sesquifulvalene, heptafulvalene, and perinaphthene.

Among these compounds, from a viewpoint that the reaction can be carried out economically under a mild condition, naphthols are preferably used. Here, the aromatic compounds represented by the following general formula (1) are more preferably used, while α-naphthol is still more preferably used.

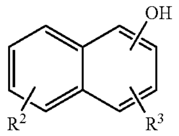

(1)

In the general formula (1), $R^2$ and $R^3$ each represent a hydrogen atom or a hydrocarbon group. Illustrative examples of the hydrocarbon group include a methyl group, an ethyl group, a n-propyl group, an isopropyl group, a n-butyl group, an isobutyl group, and a n-octyl group.

Carbonyl Compound

Any carbonyl compounds may be used without any restriction so far as they are organic compounds having a carbonyl group. Illustrative examples of the carbonyl compound include aldehydes (aldehyde compounds) such as formaldehyde, acetaldehyde, and terephthalaldehyde; and ketones (ketone compounds) such as acetone, methyl ethyl ketone, and acetylacetone. These compounds may be used singly or as a combination of two or more of them. Aldehyde compounds represented by the following general formula (2) may be preferably used as the carbonyl compound.

$$R^1\text{—CHO} \quad (2)$$

In the general formula (2), $R^1$ represents a hydrogen atom or a hydrocarbon group. Among the carbonyl compounds that are exemplified above, from industrial and economical viewpoints, formaldehyde and acetaldehyde are more preferable.

Catalyst

Illustrative examples of the catalyst include Bronsted acids such as hydrochloric acid, sulfuric acid, phosphoric acid, and citric acid; Lewis acids such as aluminum chloride, monoborane, diborane, borane trifluoride, and alumina; and bases such as ammonia, triethylamine, and alkali metal hydroxides (lithium hydroxide, sodium hydroxide, and potassium hydroxide).

Reaction Solvent

Any reaction solvents may be used without any restriction so far as they are in a liquid state under the reaction temperature and the reaction pressure. Illustrative examples of the reaction solvent include water, or organic solvents such as alcohols, ketones, and esters: for example, alcohols such as methanol, ethanol, and propanol; ketones such as acetone and methyl ethyl ketone; and esters such as methyl acetate and ethyl acetate. The reaction solvent becomes the solvent included together with the addition condensation product of the aromatic compound with the carbonyl compound in the composition containing the addition condensation product according to the present invention. From the viewpoint of efficient application of components other than the reaction solvent, it is preferable that the reaction solvent is contained in the composition in an amount of 95% by mass or less, while more preferably in the range of 95 to 50% by mass.

Surfactant

As for the surfactant, surfactants other than the addition condensation product described above may be used. These surfactants are those that satisfy the HLB value of 15 to 50 both inclusive, as calculated in accordance with the "HLB value calculation method using the organic conceptual diagram method by Fujita, Oda, et al.". Furthermore, the surfactant is more preferably a non-polymer surfactant. Illustrative examples of the surfactant include polyvinyl alcohol, cellulose, ethyl cellulose, hydroxypropyl cellulose, hydroxyethyl cellulose, hydroxypropyl methyl cellulose, sodium dodecylsulfate, sodium dodecanesulfonate, ammonium laurylsulfate, sodium cetylsulfate, sodium myristylsulfate, potassium laurylsulfate, sodium phenylphenol, sucrose, maltose, glucose, fructose, sorbitol, mannitol, xylitol, sodium benzoate, sodium linear dodecylbenzenesulfonate, sodium branched dodecylbenzenesulfonate, sodium dodecanoate, sodium octanoate, sodium butylnaphthalenesulfonate, sodium 1-naphthalenesulfonate, sodium hexadecanesulfonate, sodium octanesulfonate, ethanol, ethoxyethanol, t-butanol, propanol, methoxyethanol, glycerin, acetic acid, malic acid, salicylic acid, propionic acid, glutamic acid, aspartic acid, citric acid, ascorbic acid, ethylenediaminetetraacetic acid, histidine, ethanolamine, dextrin, laurylbetaine, niacinamide, triisopropanolamine, quaternium-22, and quaternium-45; among these, preferable are sodium dodecylsulfate, sodium hexadecanesulfonate, sodium dodecanoate, sodium butylnaphthalenesulfonate, sodium octanesulfonate, sodium 1-naphthalenesulfonate, propanol, ethanol, and 1-methoxyethanol. These may be used singly, or two or more selected from the group described above. A substance listed in this group may be formed in the condensation reaction system using compounds not listed in this group. The HLB of these surfactants is in the range of 15 to 50, preferably in the range of 20 to 50, while more preferably in the range of 25 to 50. The non-polymer here refers to the compound having a weight-average molecular weight of less than 10000. For example, in the case of a polymer or a condensation product, this refers to the compound having the value (average molecular weight) of less than 10000, in which the value is obtained by multiplying the degree of polymerization or of condensation by the molecular weight of the monomer unit. Accordingly, this does not include the compound having the value of 10000 or greater. The surfactant is preferably an anionic surfactant.

The organic conceptual diagram method is the method based on the concept that the ratio of a polar portion and a nonpolar portion in an organic compound is related to the physical properties thereof, in which all compounds are classified into an inorganic group (hydrophilic group) and an organic group (hydrophobic group), and whereby displaying them by their index values. The index values are provided in Table 1 in "Basic Emulsification Theory" by author Teruo Horiuchi; Volume 44 Issue 1, published in Journal of Society of Cosmetic Chemists of Japan; publication (published) on Mar. 20, 2010, (released) Apr. 26, 2010, pp. 2-22 (https://www.jstage.jst.go.jp/browse/sccj/44/1/_contents/-char/en).

The HLB value is determined by the following equation (3) using the inorganic and the organic value described in Table 1.

$$HLB=(\Sigma(\text{Inorganic Value})/\Sigma(\text{Organic Value}))\times 10 \quad (3)$$

In the "organic conceptual diagram method" concept, any substance can be considered as a surfactant because the HLB value of any substance can be calculated. Specifically, the addition condensation product is present in the system in the form of an addition condensation product or of a salt such as a sodium salt of an addition condensation product. In general, the HLB value of a mixture is expressed as a weighted average of the HLB values of each component. In the case of the aromatic compound: 1-naphthol, the carbonyl compound: formaldehyde, and the catalyst: sodium hydroxide, the HLB value of a monomer unit in the addition condensation product and the sodium salt or the like of the addition condensation product is, for example, about 7 for the former and about 30 for the latter. That is, depending on the ratio of the former to the latter in the system, the addition condensation product mentioned here can also fall within the scope of the "surfactant that satisfies the HLB value of 15 to 50 both inclusive". For this reason, such description as "surfactant (excluding the addition condensation product described above)" is used.

In the present invention, the surfactant is added before completion of the condensation reaction in order to prevent generation of large agglomerates. In addition, the addition of the surfactant improves the water solubility of the coating film thereby expressing a low accumulation property.

The addition condensation product of the aromatic compound with the carbonyl compound is produced by causing the reaction of these reactants in the presence of the catalyst and the surfactant in the reaction solvent, usually in the temperature range of room temperature to 200° C. for the period of 1 to 100 hours, while preferably in the temperature range of 30 to 150° C. for the period of 1 to 30 hours. The surfactant is used here in an amount of 0.01 equivalents or greater, preferably in an amount of 0.01 to 5 equivalents, relative to the aromatic compound. The aromatic compound, the carbonyl compound, the catalyst, and the surfactant each may be used singly or as a combination of two or more of them. There is no particular restriction in the timing when the surfactant is added as long as it is before the condensation reaction is completed. However, when the aromatic compound and the carbonyl compound are mixed without addition of the surfactant, clumping can occasionally take place immediately. Even if clumping does not take place immediately after mixing, clumping can occasionally take place over time or as the temperature rises. Even when the surfactant is added after clumping, redispersion is difficult. Accordingly, it is preferable to add the surfactant before the aromatic and carbonyl compounds are mixed, namely, the addition is made preferably under the state that neither both or only one of them is added.

The pH of the medium in which the condensation reaction is conducted is usually in the range of 1 to 14. Here, a pH-controlling agent may be used without any restriction. From a viewpoint to properly keep the solubility of the condensation product, it is preferable to use an alkali metal hydroxide such as lithium hydroxide, sodium hydroxide, or potassium hydroxide.

The ratio of the aromatic compound to the carbonyl compound at the time of the condensation reaction may be appropriately chosen in accordance with the kind of the aromatic compound, the carbonyl compound, the reaction solvent, and the catalyst to be used, as well as the reaction time, the reaction temperature, and the like. The carbonyl compound is used usually in the range of 0.1 to 10 moles, while preferably in the range of 0.5 to 3.0 moles, relative to 1 mole of the aromatic compound.

By so doing, the composition containing the addition condensation product can be obtained. The addition condensation product in the composition is an aromatic compound multimer in which two or more (preferably 2 to 50) composition units derived from the aromatic compound are each bonded via one composition unit derived from the carbonyl compound.

The addition compound usually includes, in addition to the aromatic compound dimer, the aromatic compound trimer (compound represented by the formula A-B-A-B-A)

to the aromatic compound 50 multimer (compound represented by the formula A-B-A-•••-B-A in which 50 of A are included).

The weight-average molecular weight of the addition condensation product of the aromatic compound with the carbonyl compound is preferably in the range of 200 to 100,000 both inclusive. Here, the weight-average molecular weight means the weight-average molecular weight in terms of the polystyrene conversion value that is measured by a gel permeation chromatography. The same applies to the description to be followed hereinafter.

As described above, the composition containing the addition condensation product according to the present invention is in the solution-like (solution) state having a viscosity of 2.0 mPa·s or greater at 25° C., or in the gel-like state at 25° C. Specifically, the composition containing the addition condensation product according to the present invention in the state as it is after completion of the condensation reaction (at the time before addition of the solution containing the pH-controlling agent and a reducing agent) is in the solution-like (solution) state having a viscosity of 2.0 mPa·s or greater at 25° C., or in the gel-like state at 25° C. In this specification, the solution in the state as it is after the condensation reaction is also referred to as the original solution. Taking the ease of handling of the original solution into consideration at the time of preparing the coating solution, the lower limit of the viscosity range is 2.0 mPa·s or greater, preferably 2.5 mPa·s or greater, while more preferably 3.0 mPa·s or greater. When the viscosity is less than 2.0 mPa·s, the addition condensation reaction has not progressed sufficiently so that the sufficient scale adhesion preventive effect cannot be obtained, or the concentration of the addition condensation product in the original solution is so low that a large amount thereof needs to be applied in order to obtain a sufficient scale adhesion preventive effect, thereby leading to the increase in the coating time or the volume of the coating solution, so that productivity thereof is lowered. Taking the ease of handling thereof and the load on a pump into consideration, the upper limit value thereof is 1000 mPa·s or less, preferably 500 mPa·s or less, while more preferably 100 mPa·s or less. The value is still more preferably in the range of 2.5 to 100 mPa·s, while especially preferably in the range of 3.0 to 100 mPa·s.

The solution containing the addition condensation product after completion of the condensation reaction may be used as it is as the polymer scale adhesion inhibitor. When the solution containing the addition condensation product is used as the polymer scale adhesion inhibitor, it is preferable that the addition condensation product is included in the solution with the concentration range of 0.1 to 15% by mass both inclusive. The amount of the addition condensation product may be controlled by adding the solvent or the like. The gel that contains the addition condensation product after completion of the condensation reaction usually returns to a solution state by heating. In addition, because the gelation property disappears when the polymer scale adhesion inhibitor is diluted with the solvent or the like during its preparation, there is no problem in the use of the polymer scale adhesion inhibitor as the scale adhesion inhibitor.

The following components may be further added at any time to the solution containing the addition condensation product.

Reducing Agent

Addition of a reducing agent brings about the following merits. Namely, the homogeneity stability of the composition containing the condensation reaction product that is obtained by the condensation reaction can be improved; and a gelled product is not formed even when this solution is stored for a long period of time so that contamination of the gelled product into the polymer product can be prevented in advance thereby preventing to adversely affect the product quality. On top of these, the scale adhesion preventive effect of a scale adhesion preventive coating film that is obtained from the addition condensation product according to the present invention can be enhanced. Examples of the reducing agent include sulfite salts, phosphite salts, nitrite salts, reducing sugars, and thiourea dioxide.

Illustrative examples of the sulfite salt include ammonium sulfite, potassium sulfite, sodium sulfite, ammonium hydrogen sulfite, sodium hydrogen sulfite, sodium dithionite ($Na_2S_2O_4$), and rongalite.

Illustrative examples of the phosphite salt include ammonium phosphite, sodium phosphite, potassium phosphite, calcium phosphite, uranyl phosphite, cobalt phosphite, ferrous phosphite, ferric phosphite, copper phosphite, barium phosphite, hydrazinium phosphite, ammonium hydrogen phosphite, sodium hydrogen phosphite, potassium hydrogen phosphite, potassium hydrogen phosphite, calcium hydrogen phosphite, cobalt hydrogen phosphite, cuprous hydrogen phosphite, cupric hydrogen phosphite, ferrous hydrogen phosphite, ferric hydrogen phosphite, lead hydrogen phosphite, barium hydrogen phosphite, magnesium hydrogen phosphite, manganese hydrogen phosphite, and hydrazinium hydrogen phosphite.

Illustrative examples of the nitrite salt include ammonium nitrite, sodium nitrite, potassium nitrite, calcium nitrite, zinc nitrite, silver nitrite, cobalt potassium nitrite, cobalt sodium nitrite, strontium nitrite, cesium nitrite, cerium nitrite, cupric nitrite, nickel nitrite, barium nitrite, magnesium nitrite, lithium nitrite, and rubidium nitrite.

Reducing sugars are sugars that have a free aldehyde group or carbonyl group and exhibit a reducing property. Illustrative examples thereof include maltose, lactose, and grape sugar (glucose).

These reducing agents may be used singly or as a combination of two or more of them. Among those reducing agents exemplified above, sulfite salts and thiourea dioxide are preferable.

When the reducing agent is used, the use amount thereof is usually in the range of 0.01 to 10 parts by mass, while preferably in the range of about 0.1 to about 3 parts by mass, relative to 100 parts by mass of the addition condensation product.

Water-Soluble Polymer

In order to enhance the hydrophilicity of the coating film thereby improving the scale adhesion preventive performance thereof, a water-soluble polymer may be added to the composition containing the addition condensation product of the aromatic compound with the carbonyl compound. Illustrative examples of the water-soluble polymer include an anionic polymer compound, an amphoteric polymer compound, a cationic polymer compound, a nonionic polymer compound, and a polymer compound having a hydroxy group. However, the surfactants used in the composition are excluded. The polymer here refers to the compound having the weight-average molecular weight of 10000 or greater. For example, in the case of a polymer or a condensation product, this refers to the compound having the value (average molecular weight) of 10000 or greater when the value is obtained by multiplying the degree of polymerization or of condensation by the molecular weight of the monomer unit; so, this does not include the compound having the value less than 10000. In the case that the water-soluble polymer is added, as for the K-value of the water-soluble polymer, the K-value is preferably within the range where the performance to enhance the hydrophilicity of the coating film is sufficiently well and where there is no problem in the solubility thereof into a solvent. Specifically, the K-value of the water-soluble polymer [K-value based on the Fikentscher equation (25° C.)] is preferably in the range of 10 to 200 both inclusive, while more preferably in the range of 80 to 150 both inclusive. Preferably, the content of the water-soluble polymer is set within the range in which there is no handling problem caused by increase in the solution viscosity. Specifically, the content of the water-soluble polymer is preferably in the range of 0.001 to 50% by mass both inclusive, while more preferably in the range of 0.01 to 30% by mass both inclusive.

pH-Controlling Agent

The pH of the composition containing the addition condensation product of the aromatic compound with the carbonyl compound may be appropriately chosen in accordance with the kind of the compounds to be used. When pH control is necessary, an acid and an alkali compound may be appropriately used as the pH-controlling agent. Illustrative examples of the acid include hydrochloric acid, sulfuric acid, nitric acid, phosphoric acid, diphosphoric acid, and myo-inositol-1,2,3,4,5,6-hexaphosphoric acid. Illustrative examples of the alkali compound include: alkali metal compounds such as LiOH, NaOH, KOH, $Na_2CO_3$, and $Na_2HPO_4$; and amine type compounds such as $NH_3$, methylamine, ethylamine, and ethylenediamine. When pH control is carried out, pH is preferably in the range of 6 to 14, while more preferably in the range of 8 to 13.

To the composition to be used in the present invention containing the addition condensation product of the aromatic compound with the carbonyl compound, ingredients other than those mentioned above may be added as needed to the extent that the purpose and the effect of the present invention are not impaired; so, specifically an inorganic colloid, an alkali metal silicate salt, an antioxidant, or the like may be added.

Polymerization Vessel and Polymer Production Method

The polymerization vessel is the polymerization vessel that is used for polymerization of a monomer, in which the addition condensation product adheres to the inner wall surface of the vessel to which the monomer contacts. The composition containing the addition condensation product is usually applied onto the inner wall surface of the polymerization vessel to adhere the addition condensation product thereto as a coating film. Here, there is no particular restriction as to the volume of the polymerization vessel.

Figure 2:
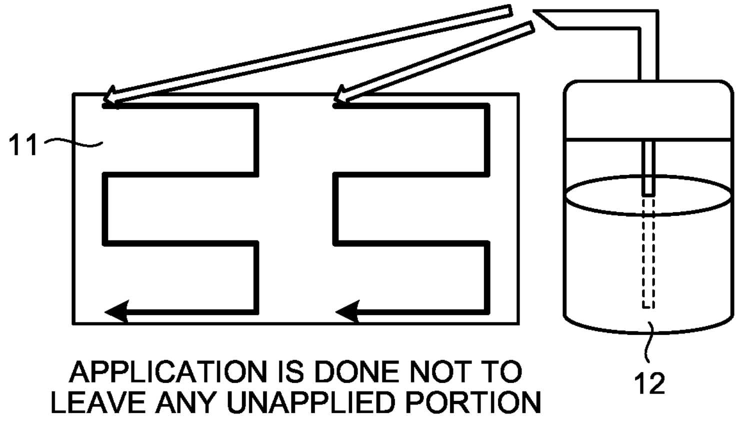
FIG. 2 is a schematic diagram illustrating one example of a method by which the composition according to the present invention, containing an addition condensation product of an aromatic compound with a carbonyl compound, is applied.

One example of an apparatus to apply the composition containing the addition condensation product of the aromatic compound with the carbonyl compound according to the present invention, as well as one example of a method for applying the composition containing the addition condensation product of the aromatic compound with the carbonyl compound according to the present invention are illustrated as schematic diagrams in FIG. 1 and FIG. 2, respectively. With reference to FIG. 1 and FIG. 2, a process for applying the composition containing the addition condensation product of the aromatic compound with the carbonyl compound according to the present invention will be described.

Although there is no particular restriction as to the method for applying the composition containing the addition condensation product of the aromatic compound with the carbonyl compound according to the present invention, it is preferable that the coating solution is applied through a nozzle by using nitrogen, air, steam, or the like as a carrier to the surface of a metal plate, the inner wall surface of the polymerization vessel, etc. Here, specifically the coating solution is a solution prepared for coating by using the original solution obtained by the condensation reaction, or by using the adjusted solution obtained by adding at least one substance selected from the pH-controlling agent, the reducing agent, the water-soluble polymer, and water to the original solution, as described below. The original solution or the adjusted solution may also be used as the coating solution. There is no particular restriction either as to a material of a substrate, namely, a metal plate and the inner wall surface of the polymerization vessel. Illustrative examples of the usable material include a carbon steel, a stainless steel, a nickel alloy, a titanium alloy, and an aluminum alloy. Especially, from a viewpoint to satisfy both the anti-corrosion property and the economic rationality, a stainless steel is preferably used. The surfaces of the metal plate and inner wall of the polymerization vessel may be polished mechanically or electrolytically, or plated as needed.

An example of the coating method to apply the composition containing the addition condensation product of the aromatic compound with the carbonyl compound according to the present invention to the surface of the polymerization vessel may be a coating process described below.

Coating Process

Preheating of Inner Wall Surface and the Like of the Polymerization Vessel

As illustrated in FIG. 1, a hot water or the like is passed through a jacket 2 that is attached to a polymerization vessel 1 to preheat the inner wall surface of the polymerization vessel to a temperature of 20° C. or higher, while preferably in the temperature range of 30 to 95° C.

Preparation and Application of the Coating Solution

A coating solution is prepared by diluting the composition containing the addition condensation product of the aromatic compound with the carbonyl compound by ethanol (ethanol is added such that the concentration thereof in the coating solution becomes 6% by weight) and deionized water such that the naphthol concentration becomes 0.2% weight; then, this coating solution is applied by pouring by using a washing bottle. Application is done from top to bottom in such a way as not to leave any unapplied portion (FIG. 2). Specifically, FIG. 2 illustrates a development view 11 of the inner wall of the straight body section of the polymerization vessel (e.g., 40 L capacity). Here, the coating solution is applied by pouring a coating solution 12 onto the inner wall by using the washing bottle.

Drying

Drying is carried out for 15 minutes with keeping the temperature of the inner wall surface of the polymerization vessel.

Water Washing

Washing is carried out by using water.

The polymerization vessel that is going to be coated is a polymerization vessel having an inner wall surface in which the monomer having an ethylenic double bond is contacted during the polymerization reaction and that is coated with the coating solution containing the addition condensation product of the aromatic compound with the carbonyl compound. Here, the inner volume of the vessel is preferably 0.01 $m^3$ or more, especially in view of producibility, the inner volume is preferably in the range of 0.01 to 600 $m^3$. The polymerization vessel may be equipped with one, or a combination of two or more equipment selected from a jacket, a coil, a baffle, a reflux condenser with which the above-described monomer can be condensed during the polymerization reaction, and an inner jacket. It is preferable that the polymerization vessel is equipped with at least a reflux condenser with which the above-described monomer can be condensed during the polymerization reaction because with this the inside of the polymerization vessel can be efficiently cooled.

The coating solution containing the addition condensation product of the aromatic compound with the carbonyl compound according to the present invention is applied to the inside of the polymerization vessel in the process in which an olefinic polymer is produced; especially, the coating solution is preferably used in the process in which a monomer containing an ethylenic unsaturated group is polymerized. Specifically, illustrative examples of the monomer containing an ethylenic unsaturated group include: halogenated vinyls such as polyvinylchloride; halogenated vinylidenes such as vinylidene chloride; vinyl esters such as vinyl acetate and vinyl propionate; esters or salts of acrylic acid and methacrylic acid; esters or acid anhydrides of maleic acid and fumaric acid; diene type monomers such as butadiene, chloroprene, and isoprene; styrene; acrylonitrile; and vinyl ethers. The coating solution containing the addition condensation of the aromatic compound with the carbonyl compound to be applied in the polymerization vessel can be preferably used especially in the process in which a vinyl halide such as vinyl chloride, a vinylidene halide such as vinylidene chloride, or a monomer mixture containing one of these monomers as the major component as well as other monomer, is subjected to a suspension polymerization or an emulsion polymerization in an aqueous medium, thereby producing a polymer or a copolymer of the monomer containing an ethylenic unsaturated group, or a copolymer of the monomer mixture as described above.

The coating solution containing the addition condensation product of the aromatic compound with the carbonyl compound according to the present invention exhibits high durability even when used in polymerization of monomers such as α-methylstyrene, acrylate esters, methacrylate esters, acrylonitrile, and vinyl acetate that have a high solubility of a coating film formed by a heretofore known polymer scale adhesion inhibitor. Thus, this solution can be preferably used even for production of polymer beads or latex of polystyrene, polymethyl methacrylate, polyacrylonitrile, or the like, and for production of synthetic rubbers such as a styrene butadiene rubber (SBR), an acrylonitrile butadiene rubber (NBR), a chloroprene rubber (CR), an isoprene rubber (IR), and a butyl rubber (IIR) (these synthetic rubbers are produced usually by an emulsion polymerization), and for production of an ABS resin.

In polymerization of one, or two or more of these monomers, the object and effect of prevention of forming the polymer scale can be achieved regardless of the polymerization method such as a suspension polymerization, an emulsion polymerization, a bulk polymerization, and a solution polymerization, or even when the polymerization is conducted in the presence of any additive such as an emulsifier, a stabilizer, a lubricant, a plasticizer, a pH-controlling agent, or a chain-transfer agent. For example, in a suspension polymerization or an emulsion polymerization of a vinyl type monomer, various additives may be added to the polymerization system as needed. Illustrative examples of such additives include suspension stabilizers such as partially saponified polyvinyl alcohol and methyl cellulose; anionic emulsifiers such as sodium laurylsulfate; nonionic emulsifiers such as sorbitan monolaurate and polyoxyethylene alkyl ether; stabilizers such as lead tribasic sulfate, calcium stearate, dibutyltin dilaurate, and dioctyltin mercaptide; chain-transfer agents such as trichloroethylene and mercaptan; and various pH-controlling agents. Even when these additives are present in the polymerization system, adhesion of the polymer scale can be effectively prevented.

The coating solution containing the addition condensation product of the aromatic compound with the carbonyl compound according to the present invention can, even when any polymerization initiator is used, exhibit the intended polymer scale adhesion preventive effect without being affected by the type of the polymerization initiator. Illustrative examples of the polymerization initiator include t-butylperoxy neodecanoate, bis(2-ethylhexyl)peroxy dicarbonate, 3,5,5-trimethylhexanoyl peroxide, α-cumylperoxy neodecanoate, cumene hydroperoxide, cyclohexanone peroxide, t-butylperoxy pivalate, bis(2-ethoxyethyl)peroxy dicarbonate, dibenzoyl peroxide, diisopropylbenzene hydroperoxide, lauroyl peroxide, 2,4-dichlorobenzoyl peroxide, diisopropylperoxy dicarbonate, α,α'-azobisisobutyronitrile, α,α'-azobis-2,4-dimethyl valeronitrile, di-2-ethylhexyldiperoxy isophthalate, potassium persulfate, and ammonium persulfate.

Other conditions upon polymerizing various monomers by using the polymerization initiators mentioned above may be the same as those used conventionally; so, there is no particular restriction so far as the advantageous effects of the present invention are not impaired. Specifically, although typical polymerization conditions will be described below with referring to the cases of a suspension polymerization, a solution polymerization, and a bulk polymerization as the examples of polymerization of various monomers by using the polymerization initiators mentioned above, the present invention is not restricted by these polymerization conditions and so forth.

In the case of a suspension polymerization, firstly, water and a dispersant are charged into the polymerization vessel, followed by charging of a polymerization initiator thereinto. Next, the inside of the polymerization vessel is either evacuated to the pressure range of about 0.001 to 101 kPa-G (about 0.01 to 760 mmHg) or set at an atmospheric pressure. Then, the monomer is charged thereinto in the amount enough to increase the inner pressure of the polymerization vessel usually in the range of 49 to 2940 kPa-G (0.5 to 30 $kgf/cm^2 \cdot G$); and then, the polymerization is conducted in the reaction temperature range of 30 to 150° C. During polymerization, one, or two or more of water, the dispersant, and the polymerization initiator may be added as needed. The reaction temperature during polymerization varies depending on the monomer to be polymerized; for example, in the case of vinyl chloride the polymerization is carried out in the temperature range of 30 to 80° C., and in the case of styrene the polymerization is conducted in the temperature range of 50 to 150° C. The polymerization is deemed to have completed either when the inner pressure of the polymerization vessel has dropped to the value in the range of 0 to 686 kPa-G (0 to 7 $kgf/cm^2 \cdot G$) or when the difference between the inlet temperature and the outlet temperature of the cooling water flowing in and out of the cooling jacket fitted to around outside of the polymerization vessel has become substantially nil (namely, when heat generation due to the polymerization reaction has been subsided). The amounts of water, the dispersant, and the polymerization initiator that are charged for the polymerization are usually in the range of 20 to 500 parts by mass, in the range of 0.01 to 30 parts by mass, and in the range of 0.01 to 5 parts by mass, respectively, relative to 100 parts by mass of the monomer.

In the case of a solution polymerization, an organic solvent such as toluene, xylene, or pyridine is used in place of water as the polymerization medium. A dispersant may be used as needed. In general, other polymerization conditions are the same as those of the suspension polymerization described above.

In the case of a bulk polymerization, the inside of the polymerization vessel is either evacuated to the pressure of about 0.001 to 101 kPa-G (in the range of about 0.01 to 760 mmHg) or set at an atmospheric pressure. Then, the monomer and the polymerization initiator are charged into the polymerization vessel; and then, the polymerization is carried out at the reaction temperature of −10 to 250° C. For example, in the case of vinyl chloride, the polymerization can be conducted in the temperature range of 30 to 80° C., and in the case of styrene, the polymerization can be carried out in the temperature range of 50 to 150° C.

The present invention shall not be restricted by the embodiments described above. The compositions that are arbitrary combination of the composition elements described above shall be included in the present invention. Further effects and modification examples may be readily obtained by a person having ordinary skill in the art. Therefore, wider embodiments of the present invention are not limited to the embodiments described above; thus, they may be variously modified.

EXAMPLES

Hereinafter, although the present invention will be described specifically on the basis of Examples, the present invention is not limited to these Examples.

Synthesis Example 1

A reactor having been fully displaced with a nitrogen gas by flowing a nitrogen gas therethrough was charged with 1445 mL of deionized water; then, with stirring, the content in the reactor was preheated to 35° C. Next, 17 g of sodium hydroxide, 150 g of sodium dodecylsulfate, and 150 g of α-naphthol were added. After the resulting mixture was stirred for 30 minutes, 80.0 g of an aqueous solution of 37% by weight of formaldehyde was added; then, the temperature inside the reactor was raised to 60° C. to cause the mixture in the reactor to react for 3 hours. After the temperature inside the reactor was raised to 80° C., the mixture in the reactor was caused to react for 1 hour. The reactor was then allowed to be cooled, and the internal temperature was lowered to 40° C. to obtain an original solution No. 1 (condensation product No. 1). When the internal temperature dropped to 40° C., a mixed solution of 4.45 g of sodium hydroxide, 13.3 g of an aqueous solution of 50% by weight of myo-inositol-1,2,3,4,5,6-hexaphosphate, 169 mL of deionized water, and 6 g of sodium dithionate was added; then, the resulting mixture was stirred for 90 minutes. Thus, an adjusted solution No. 1 was finally obtained. The viscosity of the adjusted solution No. 1 at 25° C. was 3.05 mPa·s.

When the adjusted solution No. 1 was filtrated through a nylon filter having a pore diameter of 20 μm, there was no difference in the filter weight before and after the filtration, so that there was no precipitation greater than 20 μm recognized. In this specification, the composition in the state that "even when filtrated through a nylon filter having a pore diameter of 20 μm, there is no difference in the filter weight before and after the filtration, so that there is no precipitation greater than 20 μm recognized" is referred to as a homogeneous solution. Because the adjusted solution No. 1 is homogeneous, the original solution No. 1 is also considered to be a homogeneous solution having no precipitation of 20 μm or greater recognized if this would have been filtrated as described above.

Synthesis Example 2

An original solution No. 2 (condensation product No. 2) and an adjusted solution No. 2 were obtained in the same manner as in Synthesis Example 1, except that 1449 mL instead of 1445 mL of deionized water was added and 115 g of sodium 1-octanesulfonate instead of 150 g of sodium dodecylsulfate was added before preheating. The viscosity of the adjusted solution No. 2 at 25° C. was 3.28 mPa·s. The adjusted solution No. 2 was also in the homogeneous state. Because the adjusted solution No. 2 is homogeneous, the original solution No. 2 is also considered to be a homogeneous solution having no precipitation of 20 μm or greater recognized if this would have been filtrated as described above.

Synthesis Example 3

An original solution No. 3 (condensation product No. 3) and an adjusted solution No. 3 were obtained in the same manner as in Synthesis Example 1, except that 1192 mL instead of 1445 mL of deionized water was added and 371 g of an aqueous solution of 40% sodium butylnaphthalenesulfonate instead of 150 g of sodium dodecylsulfate was added before preheating. The viscosity of the adjusted solution No. 3 at 25° C. was 3.54 mPa·s. The adjusted solution No. 3 was also in the homogeneous state. Because the adjusted solution No. 3 is homogeneous, the original solution No. 3 is also considered to be a homogeneous solution having no precipitation of 20 μm or grater recognized if this would have been filtrated as described above.

As mentioned above, the viscosities of the solutions (original solutions) after completion of the reactions in Synthesis Examples 1 to 3 at 25° C. were not measured, but it is considered the viscosities of them are higher than the viscosity after the addition of a solution containing a pH controlling agent and a reducing agent, which are not the substances like a polymer that causes a large viscosity change with a small amount; thus, it is clear that the viscosities of the original solutions satisfy the requirement of 2.0 mPa·s or greater.

Synthesis Example 4

A composition No. 4 (condensation product No. 4) and an adjusted composition No. 4 were obtained in the same manner as in Synthesis Example 1, except that 118 g of sodium laurate instead of 150 g of sodium dodecylsulfate was added before preheating. The viscosities of the composition No. 4 and of the adjusted composition No. 4 were not measured because they gelled uniformly at 25° C. The composition No. 4 returns to the solution state by heating at 40° C. In addition, because the gelation property disappears when the adjusted composition No. 4 is diluted during preparation of the coating solution, there is no problem in the use thereof as the scale adhesion inhibitor.

In the original solutions No. 1 to 3 or the composition No. 4 obtained in Synthesis Examples 1 to 4, the amount of the solvent was included in the original solutions No. 1 to 3 or the composition No. 4 in an amount of 95% by mass or less.

Comparative Example 1

When the reaction was carried out in the same manner as in Synthesis Example 1, except that 1563 mL instead of 1445 mL of deionized water was used and 150 g of sodium dodecylsulfate was not added before preheating, agglomerates were formed soon after the temperature reached 60° C. The resulting agglomerates could not be redispersed, so that the condensation product could not be obtained as the uniform solution state.

Comparative Example 2

An original solution No. 5 and an adjusted solution No. 5 were obtained in the same manner as in Synthesis Example 1, except that 1363 mL instead of 1445 mL of deionized water was added and 200 g of N-methylpyrrolidone (NMP) instead of 150 g of sodium dodecylsulfate was added before preheating. The viscosity of the adjusted solution No. 5 at 25° C. was 4.56 mPa·s.

Comparative Example 3

The reaction was carried out in the same manner as in Synthesis Example 1 except that 1413 mL instead of 1445 mL of deionized water was added and 150 g of 1-dodecylpyridinium chloride instead of 150 g of sodium dodecylsulfate was added before preheating; then, agglomerates were formed during the reaction. The resulting agglomerates could not be redispersed, so that the condensation product could not be obtained as the uniform solution state.

Comparative Example 4

The reaction was carried out in the same manner as in Synthesis Example 1 except that 1491 mL instead of 1445 mL of deionized water was added and 73 g of sodium hexanoate instead of 150 g of sodium dodecylsulfate was added before preheating; then, agglomerates were formed during the reaction. The resulting agglomerates could not be redispersed, so that the condensation product could not be obtained as the uniform solution state.

Comparative Example 5

The reaction was carried out in the same manner as in Synthesis Example 1 except that 1478 mL instead of 1445 mL of deionized water was added and 85 g of sodium 1-butanesulfonate instead of 150 g of sodium dodecylsulfate was added before preheating; then, agglomerates were formed during the reaction. The resulting agglomerates could not be redispersed, so that the condensation product could not be obtained as the uniform solution state.

HLB Value

Table 1 describes the HLB values calculated based on the above formula (3) for the surfactants used in Synthesis Examples 1 to 4 and Comparative Examples 3 to 5, as well as their ability to prevent insolubilization. The insolubilization prevention ability (i.e., clumping prevention) was determined visually.

TABLE 1

| | Surfactant | HLB value | Clumping prevention Yes (○), No (X) |
|---|---|---|---|
| Synthesis Example 1 | Sodium 1-dodecylsulfate | 28 | ○ |
| Synthesis Example 2 | Sodium 1-octanesulfonate | 47 | ○ |
| Synthesis Example 3 | Sodium butylnaphthalenesulfonate | 29 | ○ |
| Synthesis Example 4 | Sodium laurate | 27 | ○ |
| Comparative Example 3 | 1-Dodecypyridinium chloride | 11 | X |
| Comparative Example 4 | Sodium hexanoate | 54 | X |
| Comparative Example 5 | Sodium 1-butanesulfate | 94 | X |

As can be seen in Table 1, the surfactant having a sulfonate group, a carboxy group, or a sulfate group is effective in clumping prevention, indicating that a specific substituent is not necessary for clumping prevention, but it is necessary that the surfactant having the HLB value in the range of 15 to 50, preferably 25 to 50, is added before the time when the temperature reaches the point at which the condensation reaction starts. The temperature at which the condensation reaction starts is affected by the reaction condition such as the pH of the reaction system and the ratio of the aromatic compound to the carbonyl compound; thus, this cannot be generalized, but it is preferable that the addition is made at the temperature of 35° C. or lower at which the condensation reaction does not start yet. The amount of the surfactant required to prevent the clumping depends on the compatibility of the surfactant with the aromatic compound, although the amount is preferably 0.01 equivalents or greater relative to the aromatic compound.

Application

Pouring Application Using Washing Bottle and Drying

A polymerization vessel made of a stainless steel with the inner volume of 0.04 $m^3$ was used as a polymerization vessel 1. The inner wall surface of the polymerization vessel 1 is preheated to 50° C. by flowing a hot water through a jacket 2. A coating solution (No. A to E), which has been prepared in advance such that the amount of α-naphthol and ethanol in the coating solution are 0.2% and 6.0% by weight, respectively, is then applied by pouring using a wash bottle (FIG. 2). For example, in the case that 20 kg of the coating solution is prepared by using the adjusted solution having a naphthol concentration of 7.5% by weight, after 18.27 kg of deionized water and 1.20 kg of ethanol are mixed and stirred, this is mixed and stirred with 0.54 kg of the adjusted solution to obtain the coating solution. Application is done from top to bottom in such a way as not to leave any unapplied portion. This is allowed to leave for drying for 15 minutes, which is then followed by rinsing with water. The ratios of the agents in preparation of the coating solutions A to E of the adjusted solutions No. 1 to 5 are described in Table 2. The naphthol amount and the naphthol concentration here are the values calculated from the naphthol amount used in the condensation.

TABLE 2

| | Coating solution No. (Adjusted solution) | | | | |
|---|---|---|---|---|---|
| | A (Adjusted solution No. 1) | B (Adjusted solution No. 2) | C (Adjusted solution No. 3) | D (Adjusted solution No. 4) | E (Adjusted solution No. 5) |
| Naphthol concentration in adjusted solution % by weight | 7.5 | 7.5 | 7.5 | 7.5 | 7.5 |
| Deionized water parts by weight | 34 | 34 | 34 | 34 | 34 |
| Ethanol parts by weight | 2.2 | 2.2 | 2.2 | 2.2 | 2.2 |
| Adjusted solution parts by weight | 1 | 1 | 1 | 1 | 1 |

Polymerization

The polymerization vessel having been treated with the above-described "Application" was charged with 200 parts by weight of deionized water, 0.020 parts by weight of a partially saponified polyvinyl alcohol, and 0.026 parts by weight of 2-hydroxypropyl methylcellulose (tradename: Metolose, manufactured by Shin-Etsu Chemical Co., Ltd., degree of the methoxyl substitution (average number of the hydroxy group displaced with the methoxyl group in the cellulose glucose ring unit): 1.9, degree of the 2-hydroxypropoxyl group substitution (mole number of the hydroxyalkoxyl group added to the cellulose glucose ring unit): 0.25); then, the inside of the polymerization vessel was degassed until 50 mmHg. Next, 100 parts by weight of vinyl chloride monomer (VCM) was charged, and then, with stirring the reaction mixture in the polymerization vessel, 0.03 parts by weight of t-butylperoxy neodecanoate was charged by pressure feeding with a pump. With stirring the charged raw material, the temperature of the inside of the vessel was raised by flowing a hot water through the jacket 2, and when the temperature reached 52° C., the polymerization was conducted with keeping the temperature of the inside of the polymerization vessel at 52° C. by flowing a cooling water through the jacket 2. The polymerization was terminated when the pressure of the inside the vessel lowered to 5 $kgf/cm^2 \cdot G$ (0.49 MPa-G). After the unreacted monomer was recovered, the slurry of the reaction mixture was withdrawn from the polymerization vessel, dehydrated, and dried to obtain a vinyl chloride polymer.

Accumulability

This was evaluated in accordance with the following standards. Interference pattern is the pattern caused by a phenomenon in a thin film, and is generally visible to the naked eyes in a variety of colors depending on the thickness of the film to be observed.

Yes: Interference pattern due to the coating film of the coating solution is recognized on the vessel's wall after polymerization.

None: Interference pattern due to the coating film of the coating solution is not recognized on the vessel's wall after polymerization, and the color is of the polymerization vessel itself.

Evaluation results of the accumulability and scaling are summarized in Table 3.

TABLE 3

| | Coating solution No. (Adjusted solution) | | | | |
|---|---|---|---|---|---|
| | A (Adjusted solution No. 1) | B (Adjusted solution No. 2) | C (Adjusted solution No. 3) | D (Adjusted solution No. 4) | E (Adjusted solution No. 5) |
| Accumulation | No | No | No | No | Yes |
| Scale | No | No | No | No | No |
| Adjusted solution at 25° C. [mPa · s] | 3.05 | 3.28 | 3.54 | Gelated | 4.56 |

As can be seen in Table 3, when the coating solution No. E using the adjusted solution No. 5 not containing the surfactant is applied, there is no scale adhesion, but accumulation is recognized. On the other hand, when the coating solutions No. A to D using the adjusted solutions No. 1 to 4 each containing the surfactant were applied, not only there was no scale adhesion but also no accumulation recognized, showing that these have an excellent wall antifouling effect, thereby suggesting that the adjusted solutions No. 1 to 4 containing the surfactants are the polymer scale adhesion inhibitors that can suppress accumulation.

The films formed from the coating solutions in Comparative Examples were so thick that the interference patterns were visible even after the coating solutions were applied, dried, and rinsed (before polymerization). On the other hand, when the coating solutions in Examples were applied, the coating films were so thick that the interference patterns were visible after drying, but most of them was washed off with water, leaving a very thin coating films. That is, the films formed from the coating solutions in Examples were so thin that the interference pattern was not visible after application, drying, and rinsing (before polymerization).

The viscosity described in Table 3 is the viscosity of the adjusted solution, not the viscosity of the coating solution. The parameter expressed by the viscosity is thought to be a comprehensive parameter considering the so-called degree of condensation, the presence or absence of the cross-linking structure, solubility, and the like, i.e., considering other parameters of the addition condensation product, in which many isomers as well as salts are formed, and the properties thereof can be altered by oxidation; so, these are the parameters of those that are difficult to be accurately analyzed. Accordingly, the viscosity is an important parameter when considering to realize suppression of the accumulation and inhibition of the scale adhesion.

Viscosity Measurement

The viscosity of the adjusted solution was measured with the following conditions.

Instrument used:

Viscometer; Digital Rotational Viscometer DV3T (manufactured by AMETEK, Inc.)

Adapter; small volume sample adapter

Spindle; SC4-18

Sample chamber; SC4-13(P)

Water jacket; SC4-45Y

Locating channel assembly; SC4-46Y

Circulation thermostatic chamber; MPC controller model MPC-K6

(Manufactured by Peter Huber Kaltemaschinenbau AG)

Jacket temperature; 25.0° C.

Rotation number; 250 RPM

Preparation for Measurement

Place 6.7 mL of the adjusted solution in the sample chamber SC4-13 (P), connect the temperature probe, and then attach this to the water jacket attached to the viscometer. Place the spindle in the attached sample chamber, set this to the viscometer, and wait until the temperature of the sample chamber reaches the predetermined temperature.

Measurement

Once the temperature of the sample chamber reaches the predetermined temperature, start the viscosity measurement. When the viscosity display is stable, read and record the value. Stable here means that the indicated viscosity value is within ±0.01 mPa·s for 10 seconds.

The results obtained above indicate that the application of the coating solution using the original solution obtained in the present invention provides an excellent antifouling effect on the vessel's wall in terms of both the scaling and the accumulation.

With the production method of the present embodiment, clumping caused by agglomeration of the condensation product of the aromatic compound with the carbonyl compound can be prevented, and thereby the condensation reaction product can be obtained in the state of a uniform solution or the like. With the condensation product of the present embodiment, as the polymer scale adhesion inhibitor onto the inner wall surface of the polymerization vessel for production of a polymer of a monomer having an ethylenic double bond, a thin coating film capable of realizing prevention of a polymer scale from adhering to an inner wall surface and the like of a polymerization vessel can be formed; so, a productivity of the polymer can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A composition comprising an addition condensation product of one or more aromatic compounds, with a carbonyl compound and a solvent, wherein the addition condensation product is an aromatic compound multimer in which two or more composition units derived from one or more aromatic compounds are each bonded via one composition unit derived from the carbonyl compound, and is obtained by causing the one or more aromatic compounds to react with the carbonyl compound in the solvent in presence of a catalyst and a surfactant (excluding the addition condensation product) whose amount is 0.01 equivalents or greater relative to the aromatic compound, the surfactant is a surfactant satisfying an HLB value in a range of 15 to 50 both inclusive as calculated in accordance with "HLB value calculation method using an organic conceptual diagram method by Fujita, Oda, et al.", the solvent is included in the composition in an amount of 95% by mass or less, and the composition is in a solution state with a viscosity of 2.0 mPa's or greater at 25° C., or in a gel-like state at 25° C., wherein said one or more aromatic compounds is not a phenol other than a naphthol.

2. The composition comprising the addition condensation product according to claim 1, wherein the composition is in a solution state with a viscosity of 2.5 mPa's or greater at 25° C.

3. The composition comprising the addition condensation product according to claim 1, wherein the one or more aromatic compounds is one or more naphthols.

4. The composition comprising the addition condensation product according to claim 1, wherein the carbonyl compound is an aldehyde compound or a ketone compound.

5. The composition comprising the addition condensation product according to claim 1, wherein the aromatic compound is a compound represented by a general formula (1) described below and the carbonyl compound is an aldehyde compound represented by a general formula (2) described below, provided that in the general formulae (1) and (2), $R^1$, $R^2$, and $R^3$ each represent a hydrogen atom or a hydrocarbon group:

(1)

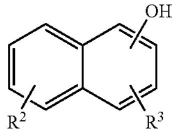

(2)

$R^1$—CHO.

6. The composition comprising the addition condensation product according to claim 1, wherein the aromatic compound is a-naphthol, and the carbonyl compound is formaldehyde.

7. The composition comprising the addition condensation product according to claim 1, wherein the surfactant is an anionic surfactant.

8. A method for producing a composition that comprises an addition condensation product of an aromatic compound with a carbonyl compound and a solvent, the method comprising:

causing an addition condensation reaction of the aromatic compound with the carbonyl compound in a reaction solvent in presence of a catalyst and a surfactant whose amount is 0.01 equivalents or greater relative to the aromatic compound (excluding the addition condensation product) to obtain the addition condensation product, wherein the addition condensation product is an aromatic compound multimer in which two or more composition units derived from the aromatic compound are each bonded via one composition unit derived from the carbonyl compound, the surfactant is a surfactant satisfying an HLB value in a range of 15 to 50 both inclusive as calculated in accordance with "HLB value calculation method using an organic conceptual diagram method by Fujita, Oda, et al.", the composition comprising the addition compound includes the solvent in an amount of 95% by mass or less, and the composition is in a solution state with a viscosity of 2.0 mPa's or greater at 25° C., or in a gel-like state at 25° C., wherein said aromatic compound is not a phenol other than a naphthol.

9. The method for producing the composition comprising the addition condensation product according to claim 8, wherein the aromatic compound is α-naphthol, the carbonyl compound is formaldehyde, and the catalyst is an alkali metal hydroxide.

10. The method for producing the composition comprising the addition condensation product according to claim 8, wherein the surfactant is an anionic surfactant.

11. A polymerization vessel used for polymerization of a monomer, wherein in the composition comprising the addition condensation product according to claim 1, the addition condensation product is adhered to a surface of an inner wall of the polymerization vessel to which the monomer contacts.

12. The polymerization vessel according to claim 11, wherein the vessel is equipped with a reflux condenser for condensing the monomer during a polymerization reaction.

13. The polymerization vessel according to claim 11, wherein the monomer is a monomer containing an ethylenic unsaturated group.

14. The polymerization vessel according to claim 13, wherein the monomer containing an ethylenic unsaturated group is vinyl chloride.

15. A method for producing a polymer comprising polymerizing the monomer in the polymerization vessel according to claim 11.

16. A method of inhibiting polymer scale adhesion in polymerization of vinyl chloride or of a monomer mixture mainly composed of vinyl chloride, said method comprising conducting said polymerization in a polymerization vessel in which the surface has been treated with an addition condensation product according to claim 1.

17. The composition comprising the addition condensation product according to claim 2, wherein the one or more aromatic compounds is one or more naphthols.

18. The composition comprising the addition condensation product according to claim 2, wherein the carbonyl compound is an aldehyde compound or a ketone compound.

19. The composition comprising the addition condensation product according to claim 3, wherein the carbonyl compound is an aldehyde compound or a ketone compound.

20. The composition comprising the addition condensation product according to claim 2, wherein the aromatic compound is a compound represented by a general formula (1) described below and the carbonyl compound is an aldehyde compound represented by a general formula (2) described below, provided that in the general formulae (1) and (2), $R^1$, $R^2$, and $R^3$ each represent a hydrogen atom or a hydrocarbon group:

(1)

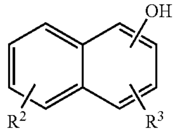

(2)

$R^1$—CHO.

* * * * *